(No Model.)
M. A. MURPHY.
BODY AND BED WARMER.
No. 495,427. Patented Apr. 11, 1893.
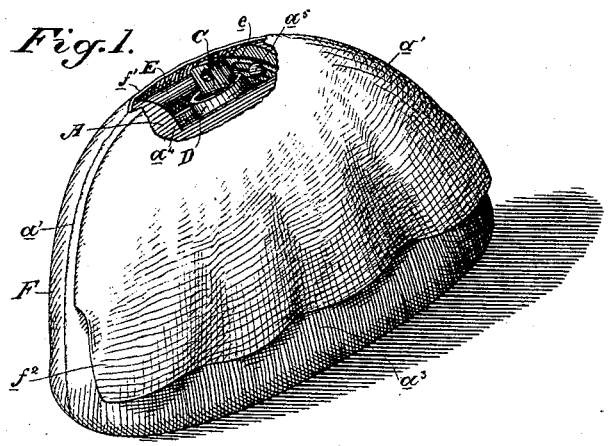
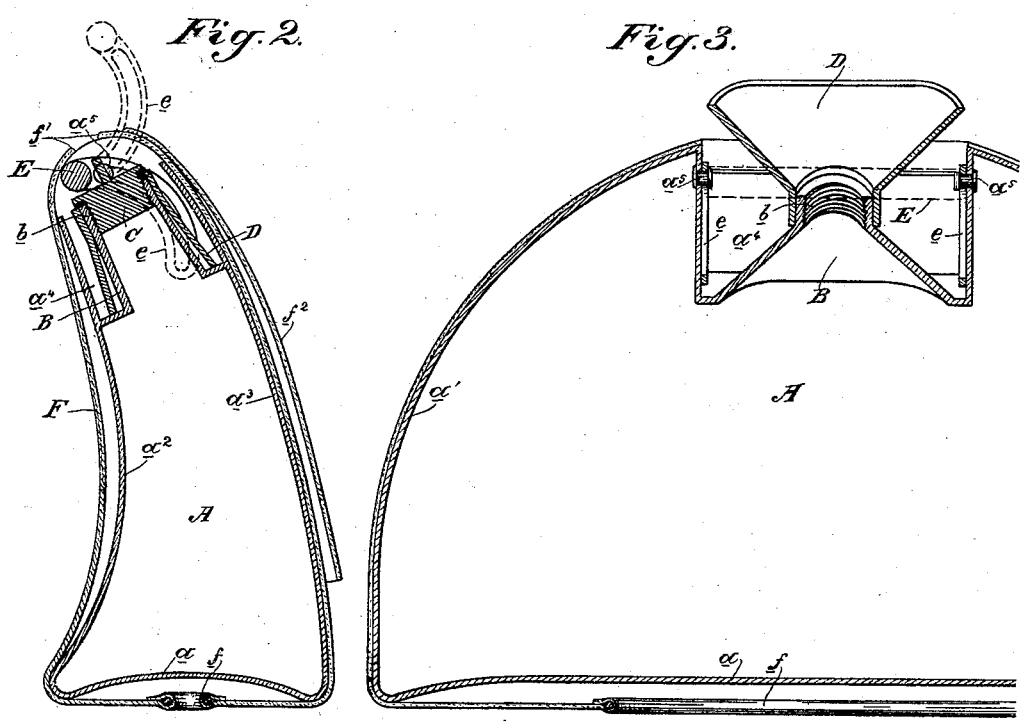
Witnesses,
Inventor,
Mary A. Murphy.
By Dewey & Co.
Attys

UNITED STATES PATENT OFFICE.

MARY A. MURPHY, OF SAN FRANCISCO, CALIFORNIA.

BODY AND BED WARMER.

SPECIFICATION forming part of Letters Patent No. 495,427, dated April 11, 1893.

Application filed September 22, 1892. Serial No. 446,609. (No model.)

*To all whom it may concern:*

Be it known that I, MARY A. MURPHY, a citizen of the United States, residing in the city and county of San Francisco, State of California, have invented an Improvement in Bed and Body Warmers; and I hereby declare the following to be a full, clear, and exact description of the same.

My invention relates to the class of devices commonly termed "bed or body warmers," and which consist of a heated vessel adapted to be placed in the bed to maintain warmth therein, and to impart heat to portions of the body brought in contact therewith.

My invention consists in the novel shape and construction of the heat imparting vessel, its attachments and its cover, as I shall hereinafter fully describe and specifically point out in the claims.

The object of my invention is to provide a warmer of this class, the shape of which adapts it not only to preserve its position in the bed, but also, and more particularly to permit the most convenient and perfect contact of portions of the body therewith. Also to provide a warmer having convenient and adjustable attachments for supplying it with hot water and emptying it when the water has served its purpose, an adjustable handle for conveniently carrying it, and a cover to protect the person from direct contact with the water containing vessel, said cover being readily removable and provided with a pocket or flap for the reception of the feet.

Referring to the accompanying drawings for a more complete explanation of my invention,—Figure 1 is a perspective view of my bed and body warmer. Fig. 2 is a transverse section showing the several attachments in position, the dotted lines showing the elevated position of the handle. Fig. 3 is a longitudinal section showing the filling funnel D in position for supplying the vessel with water.

A is the water containing vessel. It may be made of metal, or rubber, or vegetable fiber, or of any other suitable material firm enough to maintain its shape. Its base $a$ is wide enough to give it the proper stability, and said base may be flat surfaced or dished as here shown. Its ends $a'$ are curved forming an approximate semicircle, and its sides converge from the base to the top, one of said sides $a^2$ being concave and the other $a^3$ being convex, thus giving to the body of the vessel a concavo-convex shape with rounded or curving ends. All its edges are preferably rounded, whereby all injurious contact is avoided. In its top center is formed a deep recess $a^4$, fully open on top and having no communication with the interior of the vessel. In this recess is located the inverted discharge funnel B, the base of which opens through the bottom of the recess $a^4$ and is in communication with the cavity of the vessel. The top $b$ of the funnel B rises to about the plane of the top of the recess and is interiorly threaded to receive the threaded plug C by which communication is had with the interior of the vessel, and its contents are confined.

D is a removable supply funnel. When not in use, this funnel is inverted and slips over and finds a seat upon the discharge funnel B, in which position it lies wholly within recess $a^4$ and is out of the way. To use it, the funnel D is slipped off, turned right side up and after plug C is removed, its neck is slipped over the top $b$ of funnel B. The water can then be poured into the vessel, after which funnel D is removed, the plug C replaced in top $b$ and said funnel D is then inverted and slipped again to its seat on funnel B.

E is a handle, having curved slotted end arms $e$ which are seated upon and play over small studs $a^5$ in the end walls of recess $a^4$. This connection permits the handle to be drawn out to its full extent, in which position its end arms bear against the ends of one of the side walls of recess $a^4$ and hold the handle firm, whereby the vessel can be carried about. When not in use, the handle is turned forwardly, and its slotted end arms slip downwardly over studs $a^5$ until the handle lies snugly down upon the other side wall of the recess and in this position is out of the way. It will be seen that these funnel and handle attachments are so constructed and connected with the vessel A, that while always at hand and convenient for their respective uses, they are, when not in use, wholly out of the way, and below the top of the vessel. The recess $a^4$ and the discharge funnel B are so constructed and are in such position that they do not interfere with, but on the contrary facilitate the complete draining of the vessel A and the discharge of all the water therefrom.

F is a cover for vessel A. Its use, while not essential, is advantageous in protecting the body from direct contact with the vessel. It can be made of any suitable material. Fabric of any kind will answer. It consists of a sleeve-like piece having closed sides and edges and fashioned to conform to the exterior of the vessel A. Its base is open and is provided with an elastic hem $f$ which, when the cover is slipped over the vessel, snugly embraces the base $a$ of said vessel. Its top $f'$ is also open to provide access to the top of recess $a^4$ and its contained and attached parts, whereby the cover need not be removed to empty or to refill the vessel. On that side of the cover which lies over the convex side of the vessel, is attached by its top and down along its edges a suitable distance, a flap $f^2$ which is free below and provides a pocket into which the feet can be inserted.

The manner of use of my warmer is as follows:—It can be readily and conveniently filled with hot water by means of the removable plug C and funnel D, the manipulation of which, both for use and disuse I have heretofore fully described. The parts being replaced and the water confined, the vessel is easily handled by means of handle E and is carried to the bed. It is placed therein resting in an upright position on its base. When the feet are to be warmed, the vessel is placed with its convex side toward the feet, and the soles of the latter are rested against said side which, on account of its convexity receives them in the most perfect, convenient and restful contact. When the cover F is used, the warm pocket under the flap $f^2$ receives the feet, and thus the tops of the feet are warmed as well as the soles. When any rounded or convex portion of the body is to be warmed, such as the abdomen, the vessel is placed in convenient proximity to such part, with its concave side adjacent thereto, said vessel still standing in an upright position on its base. The occupant of the bed then turns his body so that the part to be warmed will come up into close contact with said concave side of the vessel. The latter standing on its own base is not a weight upon the person, as is the case with the ordinary hot water bag, but by its shape receives the perfect and convenient contact of the portion of the body brought up to it. When its use is terminated, the warmer can be carried off and its contents discharged readily.

Having thus described my invention, what I claim as new, and desire to secure by Letters Patent, is—

1. A bed and body warmer, consisting of a heat imparting vessel having formed integral with it a recess in its top with an inverted discharge funnel in said recess and communicating with the interior of said vessel, said funnel being adapted to receive a plug in its top and to form a seat for a removable filling funnel to be connected therewith for use, substantially as herein described.

2. In a bed and body warmer, the combination of a heat imparting vessel having formed integral with it a recess in its top, an inverted discharge funnel in said recess and communicating with the interior of the vessel, a removable plug in said funnel and a removable filling funnel seated on the discharge funnel within the recess when not in use and adapted to be reversed and connected with said discharge funnel for use, substantially as herein described.

3. In a bed and body warmer, the combination of a heat imparting vessel having a recess in its top, and a handle having end arms adjustably slotted over studs in said recess whereby the handle may be raised into and lowered out of position for use, substantially as herein described.

4. A bed and body warmer consisting of a water containing vessel having a base on which it stands and a concavo-convex body, said vessel having a recess in its top, the inverted discharge funnel in said recess having a removable plug in its top, and the removable filling funnel seated on said discharge funnel and adapted to be connected therewith for use, substantially as herein described.

5. A bed and body warmer consisting of a water containing vessel having a base on which it stands and a concavo-convex body, said vessel having a recess in its top, the inverted discharge funnel in said recess having a removable plug in its top, the removable filling funnel seated on said discharge funnel and adapted to be connected therewith for use, and the adjustable handle having slotted end arms engaging studs in said recess, substantially as herein described.

6. A bed and body warmer consisting of the water containing vessel with its body and recess in its top, the discharging, filling and handling attachments in said top, and the cover fitted to said vessel, having an open elastic bottom, an open top over the recess and a pocket over the side of the vessel, substantially as herein described.

In witness whereof I have hereunto set my hand.

MARY A. MURPHY.

Witnesses:
S. H. NOURSE,
J. A. BAYLESS.